(12) United States Patent
Jacobsen (10) Patent No.: US 8,718,203 B2
(45) Date of Patent: May 6, 2014

(54) SINGLE CARRIER COMMUNICATION IN DYNAMIC FADING CHANNELS (75) Inventor: Eric Jacobsen, Scottsdale, AZ (US)

(73) Assignee: Anchor Hill Communications, LLC, Scottsdale, AZ (US)

( * ) Notice: Subject to any disclaimer, the term of this patent is extended or adjusted under 35 U.S.C. 154(b) by 898 days.

(21) Appl. No.: 12/758,162

(22) Filed: Apr. 12, 2010

(65) Prior Publication Data

US 2011/0230154 A1 Sep. 22, 2011

Related U.S. Application Data (60) Provisional application No. 61/314,308, filed on Mar. 16, 2010.

(51) Int. Cl.
*H04L 27/06* (2006.01)
*H03D 1/00* (2006.01)

(52) U.S. Cl.
USPC ........... 375/341; 375/342; 375/262; 375/327; 375/299; 375/267

(58) Field of Classification Search
USPC .................................................. 375/341, 342
See application file for complete search history.

(56) References Cited

U.S. PATENT DOCUMENTS

| | | | | |
|---|---|---|---|---|
| 5,748,686 A | * | 5/1998 | Langberg et al. | 375/367 |
| 5,960,028 A | * | 9/1999 | Okamoto et al. | 375/130 |
| 6,603,811 B1 | * | 8/2003 | Dobson et al. | 375/232 |
| 6,904,110 B2 | * | 6/2005 | Trans et al. | 375/350 |

OTHER PUBLICATIONS

Viterbi et al., "Nonlinear Estimation of PSK-Modulated Carrier Phase with Application to Burst Digital Transmission", IEEE Transactions on Information Theory, vol. IT-29. No. 4, Jul. 1983, pp. 543-551.

* cited by examiner

*Primary Examiner* — Qutbuddin Ghulamali
(74) *Attorney, Agent, or Firm* — Cool Patent, P.C.

(57) ABSTRACT

Briefly, in accordance with one or more embodiments, in response to receiving a single carrier signal that is not phase locked, channel equalization may be applied to the signal via a channel equalizer. The equalized signal may be phase averaged to provide a signal that is at least partially phase stabilized. The channel equalizer may then be trained by feeding back the at least partially phase stabilized phase reference to the channel equalizer. The resulting signal may then be decoded via coherent or quasi-coherent detection.

21 Claims, 6 Drawing Sheets

SINGLE CARRIER COMMUNICATION IN DYNAMIC FADING CHANNELS

CROSS-REFERENCE TO RELATED APPLICATIONS

The present application claims the benefit of U.S. Provisional Application No. 61/314,308 filed Mar. 16, 2010 in the name of inventor Eric Jacobsen. Said Application No. 61/314,308 is hereby incorporated herein by reference in its entirety.

BACKGROUND

Digital data transmission is often accomplished using modulation schemes. For higher data rates, the equalizer complexity involved for single carrier modulation grows with the symbol rate and as a result multicarrier transmission schemes such as orthogonal frequency-division multiplexing (OFDM) typically are utilized instead. Many higher data rate systems such as systems compliant with a Wireless Fidelity (Wi-Fi) Alliance standard, a Worldwide Interoperability for Microwave Access (WiMAX) standard, a Digital Video Broadcasting-Terrestrial (DVB-T) standard, a Long Term Evolution (LTE) standard, and so on, use multicarrier modulation for this reason. Many of these systems are utilized in environments with heavy multipath propagation and/or dynamic fading, often wherein one or both of the link terminals are non-stationary. Even when the link terminals are stationary, dynamic changes in the environment, for example trucks passing by on nearby streets, may create rapid changes in the channel that challenge the synchronization capabilities of the demodulator.

Recent advances in video compression technology have greatly reduced the data rates involved to transport video data streams. Such advances have provided an opportunity to reduce the signal bandwidth used to transport video data. A reduction in signal bandwidth via compression allows certain benefits such as power concentration to increase link margin. Compression has also reopened the door for the use of single carrier modulation schemes since the equalizer complexity is more manageable at the reduced signal bandwidths. However, single carrier signal synchronization, especially carrier phase tracking, can be very difficult in fading conditions at the involved signal bandwidths which are narrower than the bandwidths for typical broadband systems, for example WiFi at 20 MHz or DVB-T at 8 MHz, and broader than the bandwidths for most cellular systems, for example 500 kHz to 1 MHz. At these intermediate signal bandwidths, both the narrow signal techniques used for many cellular systems and the broadband techniques used for higher-rate signals may be suboptimal.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
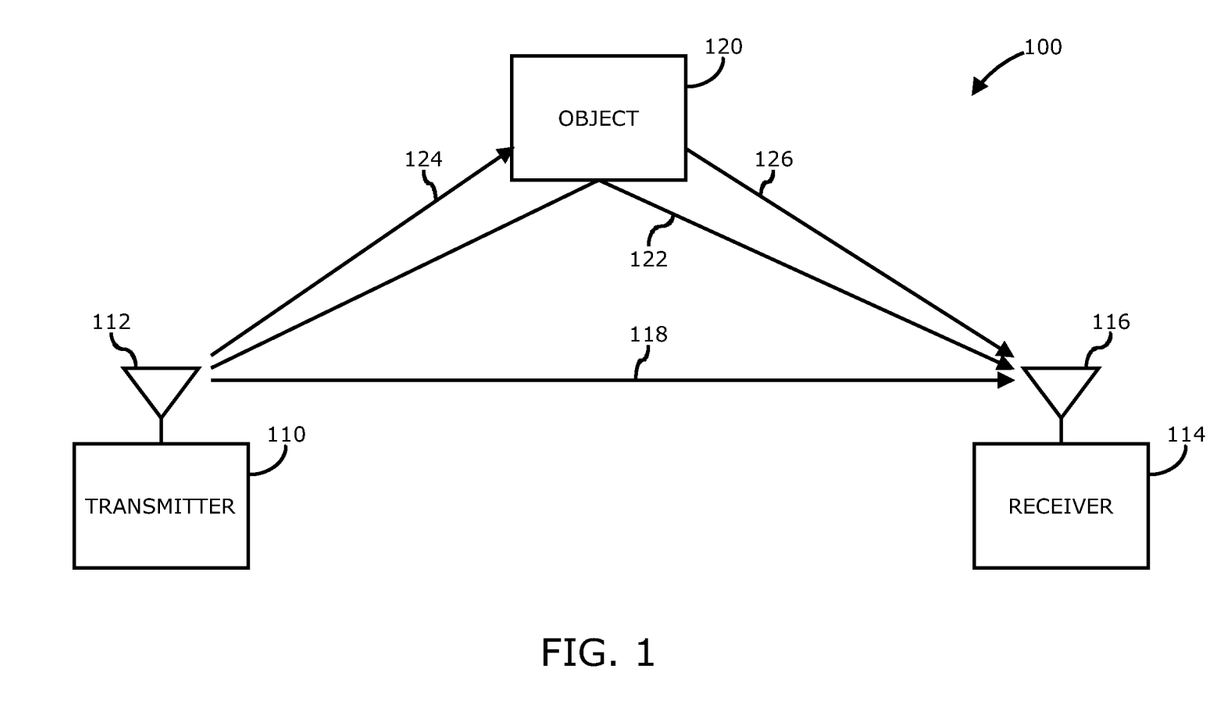
FIG. 1 is a diagram of a single carrier wireless communication system in accordance with one or more embodiments.

Referring now to FIG. 1, a diagram of a single carrier wireless communication system in accordance with one or more embodiments will be discussed. As shown in FIG. 1 generally, a single carrier wireless communication system 100 may comprise a transmitter 110 having an antenna 112 for transmitting a wireless signal 118 to a receiver 114 via antenna 116. Although FIG. 1 shows a transmitter 110 and a receiver 114 for purposes of discussion, in some embodiments one or both of these devices may comprise a transceiver capable of transmitting and receiving, and the scope of the claimed subject matter is not limited in this respect. The signal 118 transmitted from transmitter 110 to receiver 114 may be a direct line of sight signal that is the intended signal between transmitter 110 and receiver 114. However, in some environments, system 100 may suffer deleterious effects due to multipath and/or fading. For example, in the presence of an interfering object 120, at least a portion of the transmitted signal may be reflected off of object 120 via scattering and/or diffraction causing a multipath signal 122 to reach receiver 114 at a different time and/or phase than the line of sight signal 118 and which may interfere with the reception and demodulation of the line of sight signal 118. Likewise, object 120 may at least partially or altogether block a transmitted signal 124 from reaching receiver 114, or may severely attenuate the transmitted signal resulting in a shadowed signal 126 which also may be difficult to receive and demodulate. Furthermore, in a dynamic environment in which any one or more of transmitter 110, receiver 114, or object 120 is moving and therefore non-stationary, additional multipath signals and/or shadowing effects may result in attenuation, delay, and/or phase shift of the transmitted signal which may interfere with reception and/or demodulation of the transmitted signal.

As will be discussed in further detail, below, in one or more embodiments, system 100 may implement a single carrier demodulator system where the signal phase may be at least partially locked in receiver 114. The channel equalizer of receiver is then fed with an error feedback signal using the phase-locked signal, and the equalizer is trained by and applied to the phase-locked signal. In such embodiments, a single carrier transmission technique utilized by system 100 in fading multipath channels allows both carrier phase tracking in fast multipath fading as well as coherent channel equalizer training. Such an arrangement may provide mitigation against dominant impairments in dynamic multipath environments, specifically the channel response and phase perturbations due to changes in the channel.

Traditional carrier-recovery phase-locked Loop (PLL) topologies used for synchronizing the carrier phase in single carrier demodulators can be considered as long-term phase averagers that steer the intermediate frequency (IF) or baseband mixer based on long-term signal phase histories. In dynamic multipath, the carrier phase can change rapidly due to movement of the transmit antenna 112 or receiver antenna 116 or signal reflectors in the environment such as object 120. When the phase perturbations due to the environmental changes are more rapid than the effective averaging time of the carrier PLL, phase synchronization easily may be lost resulting in a dropout of signal reception and decoding. Existing techniques for surviving phase perturbations due to lower-cost oscillators and other impairments may generate a phase reference from a very short history of signal phase, typically only the most recent few symbols. Short-term phase reference generators allow link performance better than non-coherent differential decoding, but not quite as good as full coherent demodulation with a traditional carrier-recovery PLL. Such short-term phase averaging techniques are sometimes called Quasi-Coherent Detection (QCD).

In accordance with one or more embodiments, Quasi-Coherent Detection (QCD) may be utilized not only to provide a short-term phase reference for demodulation, but also to provide a short-term phase-locked signal for providing the equalizer error feedback, automatic gain control (AGC) correction, and a better reference signal for a differential decoder if used. Eliminating the carrier-recovery PLL provides robustness to the phase perturbations due to fast multipath fading, and utilizing a Least Mean Square (LMS) equalizer architecture with the QCD-locked signal provides mitigation of the channel fading. Such a single carrier demodulator for receiver 114 is shown in and described with respect to FIG. 2, below.

Figure 2:
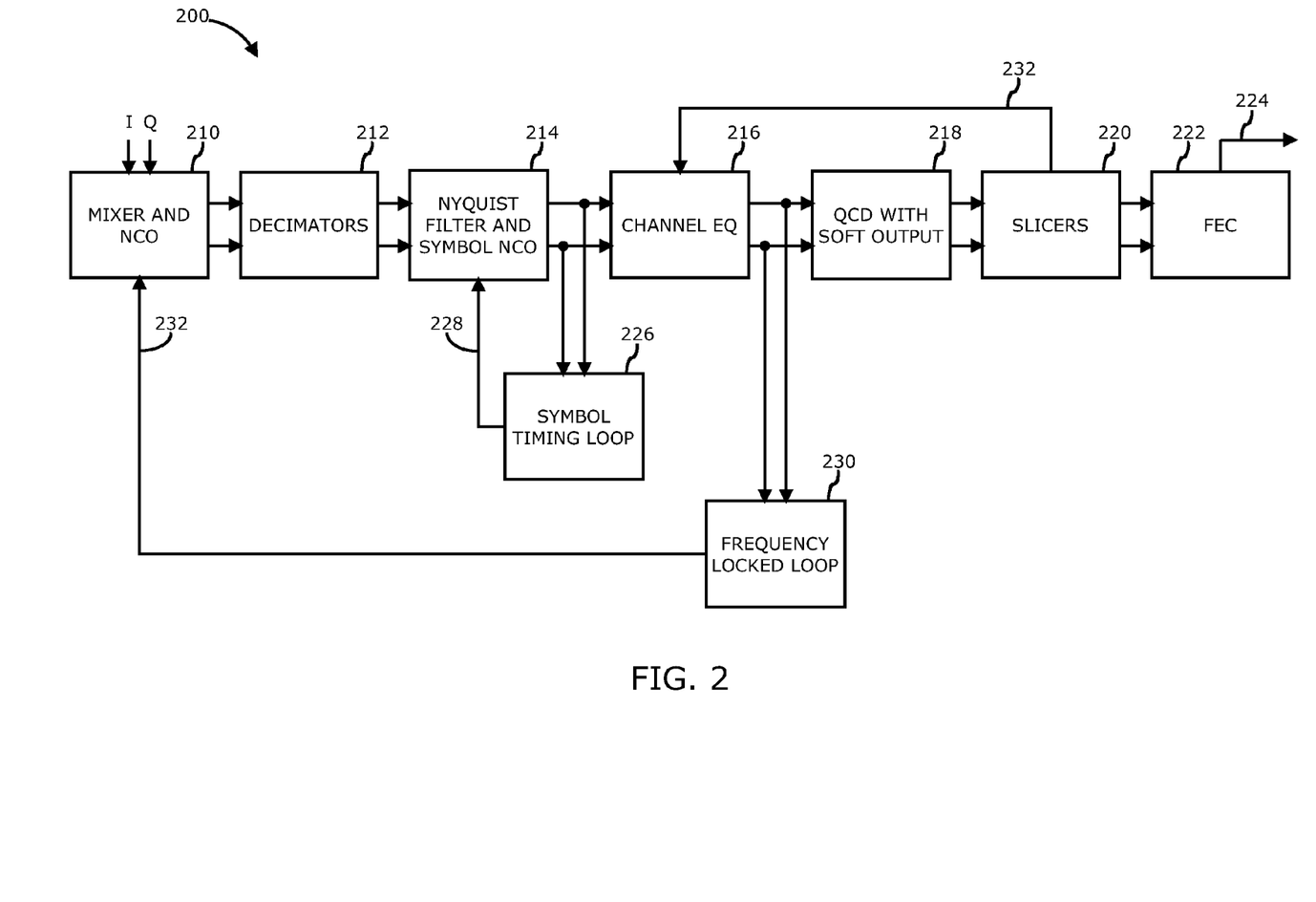
FIG. 2 is a block diagram of a single carrier demodulator in accordance with one or more embodiments.

Referring now to FIG. 2, a block diagram of a single carrier demodulator in accordance with one or more embodiments will be discussed. FIG. 2 shows an example block diagram of a single carrier demodulator 200 utilized for example in receiver 114 of FIG. 1 for demodulating signal 118 transmitted to receiver 114 from transmitter 110. In one or more embodiments, demodulator 200 comprises a mixer and numerically controlled oscillator (NCO) circuit 210 to receive in-phase (I) and quadrature (Q) signals. The output of mixer and NCO circuit 210 is provided to a decimator circuit 212 to down sample the signal that in turn feeds a Nyquist filter and symbol NCO circuit 214 for anti-aliasing of the signal. A symbol timing loop circuit 226 receives the output of Nyquist filter and symbol NCO circuit 214 and feeds a timing reference 228 back to Nyquist filter and symbol NCO circuit 214. A channel equalizer (EQ) 216 also receives the output of Nyquist filter and symbol NCO circuit 214 and in turn feeds equalized signals to quasi-coherent detector QCD processor with soft output 218. Frequency locked loop circuit 230 also receives the output of channel EQ 216 to provide a frequency reference 232 back to mixer and NCO circuit 210. Continuing along the signal chain, QCD processor 218 provides an output to slicers circuit 220 to provide clipping or limiting of the signal and/or automatic gain control (AGC) and which in turn feeds forward error correction (FEC) circuit 222. An output of slicers circuit 220 also provides an equalizer error feedback signal 232 to channel EQ circuit 216 as will be discussed in further detail, below. A demodulated output signal 224 is provided by the output of FEC circuit 222.

Since the single carrier signal received by receiver 114 and processed by demodulator 200 is not phase-locked, channel EQ 216 applies equalization to a signal with a random and/or potentially fluctuating phase received at its input. However, training of channel EQ 216 may be performed on a phase-stabilized output signal from QCD processor 218 functioning as a short-term phase averager using equalizer error feedback signal 232. Such an arrangement allows certain equalizer architectures to be utilized for channel EQ 216, for example a Least Mean Square (LMS) equalizer, which involve error feedback based at least in part on phase-coherent demodulated signals. In one or more embodiments, the architecture of such a QCD arrangement may be based at least in part on a short-term phase averaging technique described in "Nonlinear Estimation of PSK-Modulated Carrier Phase with Application to Burst Digital Transmission", IEEE Transactions on Information Theory, Vol. IT-29, No. 4, July 1983 pp. 543-550 which is hereby incorporated herein by reference, and which is often referred to as Viterbi-Viterbi detection after the names of the authors. In such an arrangement, a phase estimate for one or more or each symbol may be generated, typically by removing the modulation with an exponential for example by raising the received symbol to the fourth power for quaternary phase-shift keying (QPSK), and the phase estimates may be averaged over several symbols to provide a signal phase reference. The generated phase reference then may be applied to coherently or quasi-coherently demodulate the symbols at or near the middle of the phase estimate region. A more detailed demodulator architecture for demodulator 200 is shown in and described with respect to FIG. 3, below.

Figure 3:
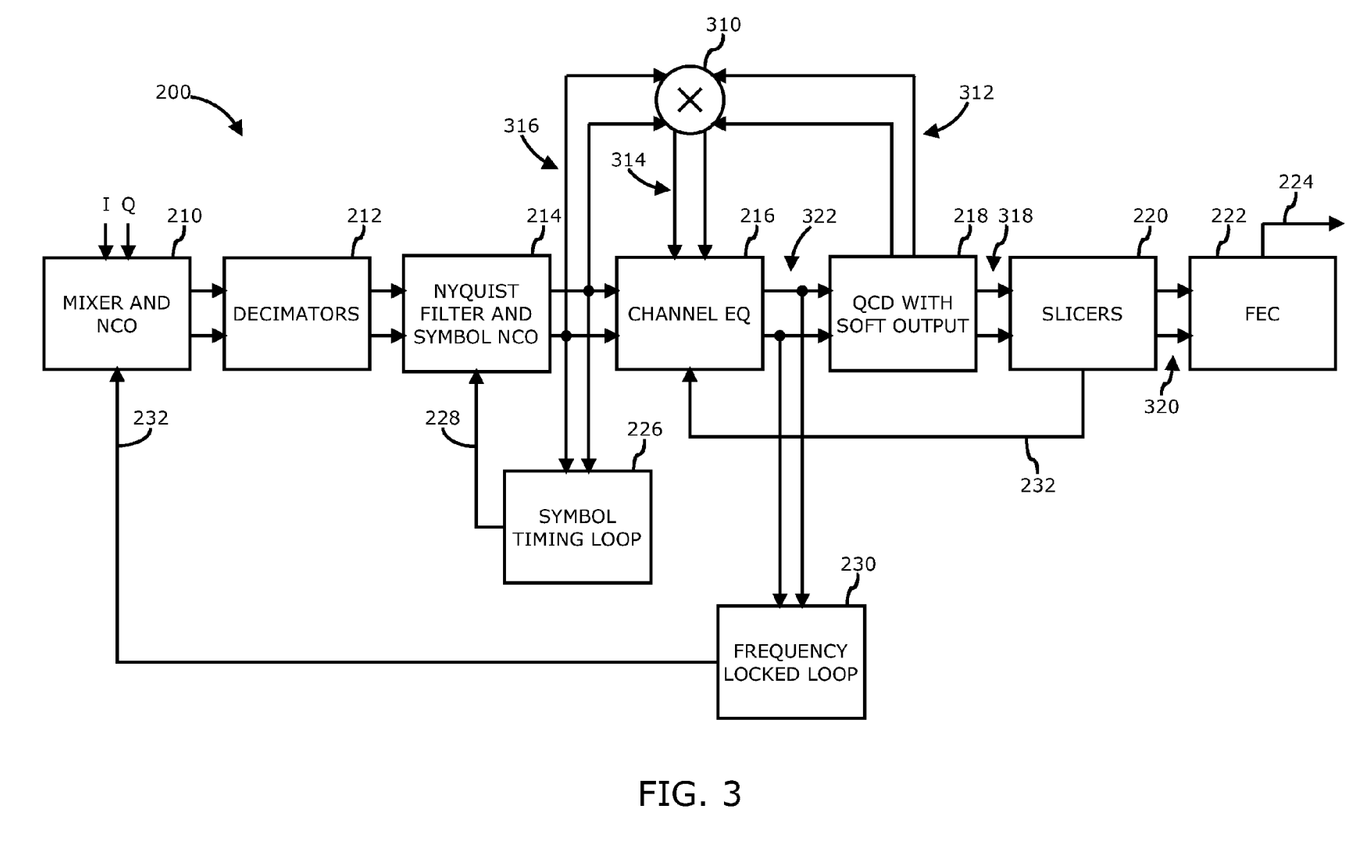
FIG. 3 is a block diagram of a more detailed single carrier demodulator in accordance with one or more embodiments.

Referring now to FIG. 3, a block diagram of a more detailed single carrier demodulator in accordance with one or more embodiments will be discussed. Demodulator 200 as shown in FIG. 3 is essentially demodulator 200 as shown in FIG. 2 but with more detail added. FIG. 3 shows a demodulator 200 having an architecture with a stabilized Equalizer Regressor path populated wherein equalizer regressor input signal 314 is applied to channel EQ 216 by mixing the output 316 of Nyquist filter and symbol NCO circuit 214 with the output 312 of QCD processor 218 via mixer 310. As shown in FIG. 3, if the received signal is not phase-locked at the input of channel EQ 216, nor at the output thereof, the phase reference of the output signal of QCD processor 218 may be utilized to phase-lock the signal fed into the path of equalizer regressor input signal 314. Such an arrangement is capable of increasing performance by increasing the correlation between the equalizer error feedback signal 232, which may be generated based at least in part on the phase-locked signal output 318 of QCD processor 218 and the signal applied to the equalizer regressor input signal 314. Channel EQ 216 may be trained on the channel of the signal based at least in part on the feedback loop comprising the output 322 of channel EQ 216 fed to QCD processor 218 providing a phase reference output 312 mixed with the input 316 to channel EQ 216 to provide equalizer regressor input signal 314. Further details of QCD processor 218 and its operation are shown in and discussed with respect to FIG. 4, below.

Figure 4:
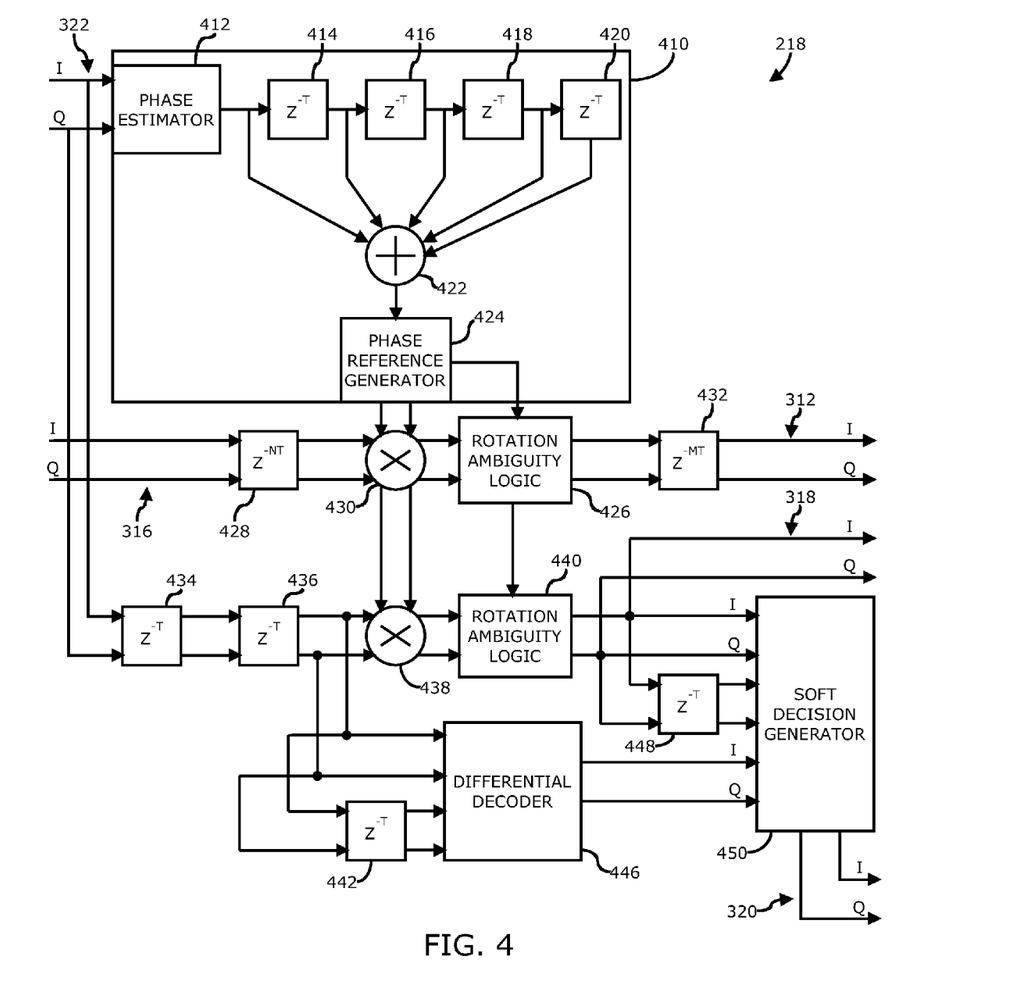
FIG. 4 is a block diagram of a quasi-coherent detector of a single carrier demodulator in accordance with one or more embodiments.

Referring now to FIG. 4, a block diagram of a quasi-coherent detector of a single carrier demodulator in accordance with one or more embodiments will be discussed. In one or more embodiments, QCD processor 218 comprises a Viterbi-Viterbi processor 410 to provide a phase average as described in the "Nonlinear Estimation of PSK-Modulated Carrier Phase with Application to Burst Digital Transmission" article cited, above. In one or more embodiments, Viterbi-Viterbi processor 410 may comprise a phase estimator circuit 412 receiving the outputs 322 of channel EQ 216 providing an output to a series of delay circuits such as delay circuit 414, delay circuit 416, delay circuit 418, and delay circuit 420, the outputs of which being combined via summer 422 and provided to phase reference generator circuit 424. The output of Viterbi-Viterbi processor 410 may be applied to rotation ambiguity logic circuits 426 and 440 to remove any ambiguity in the processed signal as will be discussed in further detail, below. In one or more embodiments, rotation ambiguity logic circuit 426 and rotation ambiguity logic circuit 440 may comprise a single rotation ambiguity logic circuit, or two sub-blocks of a single rotation ambiguity logic circuit. In some embodiments, rotation ambiguity logic circuit 426 and rotation ambiguity logic circuit 440 may comprise the same circuit, or alternatively may comprise separate individual circuits. However, the scope of the claimed subject matter is not limited in these respects.

In one or more embodiments, the input signal 316 of channel EQ 216 is received by QCD processor 218 and applied to delay circuit 428 to provide N units of delay and to mix with the output of phase reference generator 424 of Viterbi-Viterbi processor 218 via mixer 430. The output of mixer 430 is applied to rotation ambiguity circuit 426, the output of which is applied through delay circuit 432 to provide M units of delay as the output 312 of QCD processor 218 to be feed back to equalizer regressor inputs 314.

The output of mixer 430 is applied to another mixer 438 to mix with the output 322 of channel EQ 216 via delay circuit 434 and delay circuit 436. The resulting output of mixer 438 is applied to rotation ambiguity logic circuit 440, the output of which is applied to soft decision generator circuit 450, both directly and also via delay circuit 448. The output of rotation ambiguity logic circuit 440 comprises output 318 of QCD processor 218 to be applied to slicers circuit 220 for automatic gain control (ACG) and/or signal-to-noise ratio estimation. Additional inputs are applied to soft decision generator circuit 450 via the outputs of differential decoder circuit 446. Differential decoder circuit 446 receives the output of delay circuit 436, both directly and delayed via delay circuit 442. The outputs of soft decision generator circuit 320 may be applied directly to forward error correction (FEC) circuit 222.

In one or more embodiments, the generated phase reference of output 312 of QCD processor 218 provides a mechanism to derotate and phase-lock the output of channel EQ 216 which can then be used to provide the equalizer error feedback signal 232, an input for automatic gain control (ACG), an input for signal-to-noise ratio (SNR) generation, and/or to be provided to forward error correction (FEC) circuit 222 for data recovery. The input to channel EQ 216 also may be derotated to provide a coherent, stable input to the equalizer regressor input signal 314. Such an arrangement of demodulator 200 using QCD processor 218 is capable of providing a maximum, or nearly maximum, correlation between the equalizer error feedback signal 232 from subsequent processing of output signal 318 and the equalizer regressor input signal 314, although the scope of the claimed subject matter is not limited in these respects. In one more embodiment, output signal 318 may be utilized as a quasi-coherent signal for demodulation and data recovery, although the scope of the claimed subject matter is not limited in this respect.

Since the input signal 322 fed into the QCD processor 218 from Channel EQ 216 as shown in FIG. 4 is not phase-locked, the input signal 322 may be rotating in phase. To accommodate a rotating input signal 322, phase reference generator circuit 424 is capable of detecting when the phase reference rotates through the possible phases of a phase-shift keying (PSK) signal, for example through the four quadrant phase modulation points of a quaternary phase-shift keying (QPSK) signal, and removing, or at least sufficiently reducing, the resulting phase ambiguity as the signal rotates. In one or more embodiments, the phase ambiguity is capable of being removed or at least sufficiently reduced via rotation ambiguity logic circuit 426 and/or rotation ambiguity logic circuit 440, although the scope of the claimed subject matter is not limited in this respect.

In some embodiments, in very low signal-to-noise ratio (SNR) conditions, it is possible for output signal 318 of QCD processor 218 to experience phase cycle slips, which may disrupt the ability of the signal to be demodulated. In such conditions, differential coding with differential detection may be utilized via differential decoder circuit 446. As shown in FIG. 4, differential decoder circuit 446 operates on input signal 322 prior to derotation via rotation ambiguity logic circuits 426 and 440 by utilizing the generated QCD phase reference of input signal 322. In some instances, differential decoder 446 may amplify noise and potentially reduce performance. However the derotated output signal 318 optionally may be utilized to provide a more stable hard-decision reference to increase the reliability of the output of differential decoder circuit 446. Soft decision generator circuit 450 shown generates and output signal 320 based at least in part on the differentially decoded hard-decision bits at output signal 318 and applying soft-decision scaling based at least in part on the output of differential decoder circuit 446. Such an arrangement is capable of reducing the overall error rate by reducing the rate of erroneous high-confidence soft-decision outputs due to cycle slips output signal 318, although the scope of the claimed subject matter is not limited in this respect.

Figure 5:
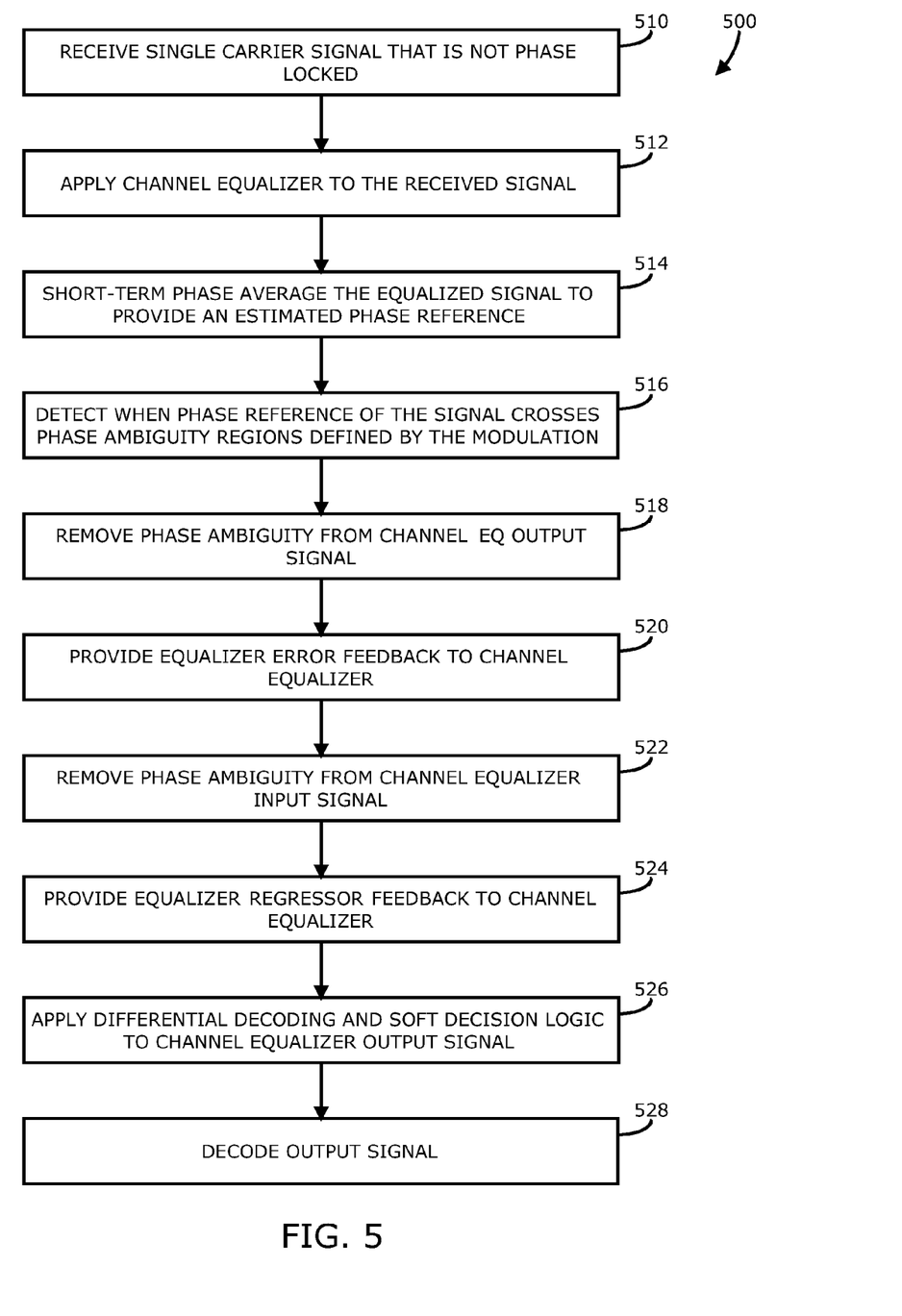
FIG. 5 is a flow diagram of a method for single carrier demodulation in accordance with one or more embodiments.

Referring now to FIG. 5, a flow diagram of a method for single carrier demodulation in accordance with one or more embodiments will be discussed. As shown in FIG. 5, method 500 may include more or fewer blocks than shown, and/or in a different order than shown, and the scope of the claimed subject matter is not limited in these respects. Furthermore, the blocks of method 500 are discussed with respect to respective blocks of demodulator 200 as shown in FIG. 2 and FIG. 3 and with respect to QCD processor 218 of FIG. 3 for purposes of example as how method 500 may be tangible embodied, however method 500 may also be implemented with other blocks and/or circuits and the scope of the claimed subject matter is not limited in this respect. In one or more embodiments, at block 510 demodulator 200 may receive a single carrier signal that is not phase locked and thus may be rotating in phase through the phase ambiguity regions defined by the modulation. The signal may be applied to Channel EQ 216 at block 512 for shaping of the received signal such that any inter-symbol interference (ISI) may be reduced or minimized. The output signal 322 of Channel EQ 216 may be short-term phase averaged at block 514 via Viterbi-Viterbi processor 410 to provide an estimated phase reference for the signal. The phase of the signal may then be monitored to detect at block 516 if/when the phase reference of the signal crosses phase ambiguity regions defined by the particular modulation scheme applied to the signal, for example the four phase modulation points of QPSK modulation. Any phase ambiguity in the phase of the signal may then be removed at block 518 if/when the phase of the signal passes through a constellation point, for example via rotation ambiguity logic circuit 440. The resulting signal may then be feed back to Channel EQ 216 at block 520 as Equalizer Feedback signal 232.

In one or more embodiments, phase ambiguity may likewise be removed from the input signal 314 of Channel EQ 216 at block 522 if/when the phase of the input signal 314 passes through a phase ambiguity region defined by the modulation, for example via rotation ambiguity logic circuit 426. The resulting signal 312 may be provided to the Equalizer Regressor Input signal 314 of Channel EQ 216 at block 524. Optionally, differential decoding via Differential Decoder circuit 446 may be applied to the output signal 322 of Channel EQ 216 at block 526 to reduce the overall error rate in the event of any phase cycle slips in the processed signal, and soft-decision logic may be applied to the signal to provide an output signal 320. Output signal 320 may then be decoded at block 528. In one or more embodiments, method 500 may be implemented in an information handling system incorporating a receiver 114 and/or transceiver that includes demodulator 200. An example of such an information handling system is shown in and described with respect to FIG. 6, below.

Figure 6:
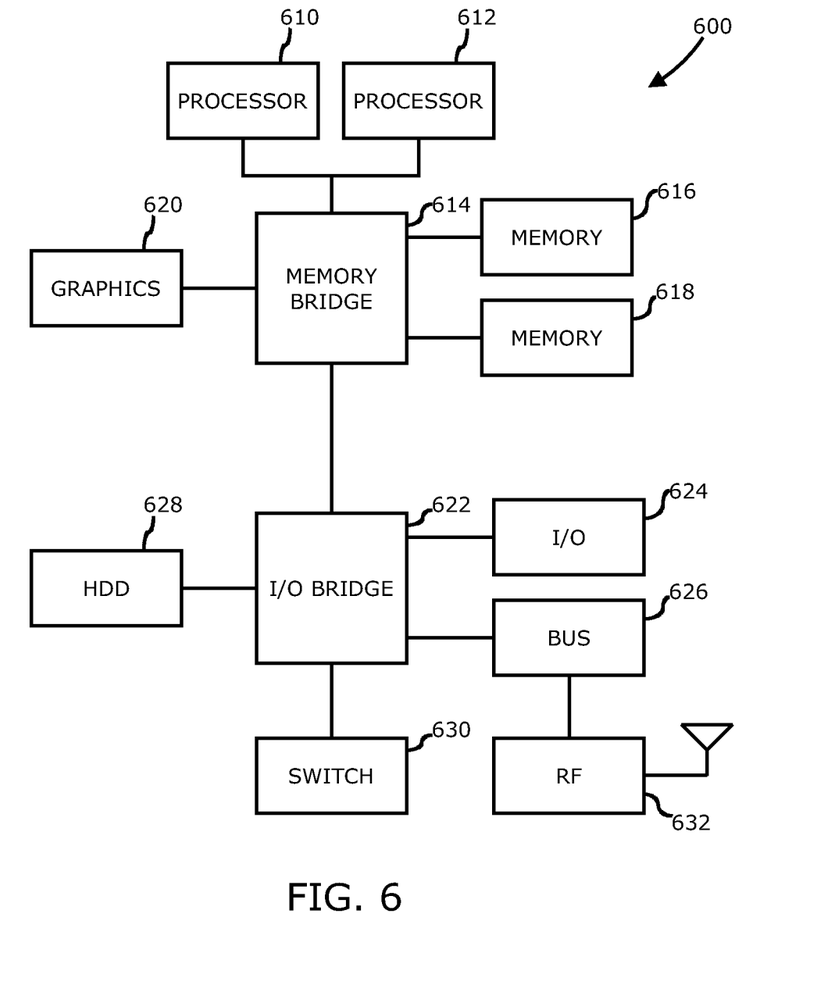
FIG. 6 is a block diagram of an information handling system capable of utilizing a single carrier demodulator in accordance with one or more embodiments.

Referring now to FIG. 6, a block diagram of an information handling system capable of utilizing a single carrier demodulator in accordance with one or more embodiments will be discussed. Information handling system 600 of FIG. 6 may represent the hardware of a device or system incorporating receiver 114 of FIG. 1 and demodulator 200 of FIG. 2 or FIG. 3, with greater or fewer components depending on the hardware specifications of the particular device. Although information handling system 500 represents one example of several types of computing platforms, information handling system 500 may include more or fewer elements and/or different arrangements of elements than shown in FIG. 5, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more processors 610 and/or 612. Memory 616 and/or memory 618 may comprise various types of semiconductor based memory, for example volatile type memory and/or non-volatile type memory. Memory bridge 614 may couple to a graphics system 620 to drive a display device (not shown) coupled to information handling system 600.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial ATA type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a radio-frequency (RF) block 632 comprising RF circuits and devices for wireless communication with other wireless communication devices and/or via wireless networks transmitter 110 and/or receiver 114 of FIG. 1, although the scope of the claimed subject matter is not limited in this respect. Furthermore, at least some portion of transmitter 110 and/or receiver 114 may be implemented by processor 610, for example the digital functions of receiver 114 which may include processing of the baseband and/or quadrature signals, although the scope of the claimed subject matter is not limited in this respect.

Although the claimed subject matter has been described with a certain degree of particularity, it should be recognized that elements thereof may be altered by persons skilled in the art without departing from the spirit or scope of claimed subject matter. It is believed that the subject matter pertaining to single carrier communication in dynamic fading channels and many of its attendant utilities will be understood by the forgoing description, and it will be apparent that various changes may be made in the form, construction and/or arrangement of the components thereof without departing from the scope or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving a single carrier signal that is not phase locked;
   applying channel equalization to the signal via a channel equalizer;
   phase averaging a phase of the signal to provide a signal that is at least partially phase stabilized;
   feeding back a phase reference to the channel equalizer from the at least partially phase stabilized signal for training of the channel equalizer; and
   decoding the signal to obtain data encoded in the signal;
   wherein said feeding back a phase reference to the channel equalizer comprises providing a regressor signal to an equalizer regressor input of the channel equalizer, the regressor signal comprising an input signal of the channel equalizer at least partially phase locked by the phase reference.

2. A method as claimed in claim 1, further comprising:
  detecting if a phase reference of the signal crosses a phase ambiguity region defined by modulation of the signal; and
  if the phase reference of the signal crosses a phase ambiguity region, removing phase ambiguity from the signal.

3. A method as claimed in claim 1, wherein said phase averaging comprises coherent detection or quasi-coherent detection.

4. A method as claimed in claim 1, further comprising feeding back an equalizer error signal to the channel equalizer.

5. A method as claimed in claim 1, wherein said phase averaging a phase of the signal comprises Viterbi-Viterbi processing of the signal.

6. An apparatus, comprising:
  means for receiving a single carrier signal that is not phase locked;
  means applying channel equalization to the signal via a channel equalizer;
  means for phase averaging a phase of the signal to provide a signal that is at least partially phase stabilized;
  means for feeding back a phase reference to the channel equalizer from the at least partially phase stabilized signal for training of the channel equalizer; and
  means for decoding the signal to obtain the data encoded in the signal;
  wherein said means for feeding back a phase reference to the channel equalizer comprises means for providing a regressor signal to an equalizer regressor input of the channel equalizer, the regressor signal comprising an input signal of the channel equalizer at least partially phase locked by the phase reference.

7. An apparatus as claimed in claim 6, further comprising:
  means for detecting if a phase reference of the signal crosses a phase ambiguity region defined by modulation of the signal; and
  means for removing phase ambiguity from the signal if the phase reference of the signal crosses a phase ambiguity region.

8. An apparatus as claimed in claim 6, wherein said means for phase averaging comprises coherent detection or quasi-coherent detection.

9. An apparatus as claimed in claim 6, further comprising means for feeding back an equalizer error signal to the channel equalizer.

10. An apparatus as claimed in claim 6, wherein said means for phase averaging a phase of the signal comprises means for Viterbi-Viterbi processing of the signal.

11. An apparatus, comprising:
  a channel equalizer to equalize a received single carrier signal that is not phase locked;
  a quasi-coherent detector to phase average a phase of the signal received from an output of the channel equalizer to provide a signal that is at least partially phase stabilized;
  wherein the channel equalizer includes a regressor input coupled to an output of the quasi-coherent detector to receive an equalizer regressor feedback signal to train the equalizer on a channel of the signal, the equalizer regressor signal comprising an input signal of the channel equalizer at least partially phase locked by a phase reference from the quasi-coherent detector.

12. An apparatus as claimed in claim 11, wherein the channel equalizer comprises an equalizer error signal input coupled to another output of the quasi-coherent detector to receive an error signal as an equalizer error feedback signal.

13. An apparatus as claimed in claim 11, wherein the quasi-coherent detector comprises a Viterbi-Viterbi processor to perform phase averaging of a phase of the signal.

14. An apparatus as claimed in claim 11, wherein the quasi-coherent detector comprises:
  a phase reference generator to detect if a phase reference of the signal crosses a phase ambiguity region defined by modulation of the signal; and
  a rotation ambiguity logic circuit to remove phase ambiguity from the signal if the phase reference of the signal crosses a phase ambiguity region.

15. An apparatus, comprising:
  a phase averager circuit including a phase reference generator to phase average a single carrier signal that is not phase locked from a channel equalizer to at least partially phase stabilize the signal using a phase reference generated by the phase reference generator; and
  a rotation ambiguity logic circuit coupled to receive the at least partially phase stabilized signal from the phase averager to remove phase ambiguity from the signal if a phase of the signal crosses a phase ambiguity region defined by modulation of the signal.

16. An apparatus as claimed in claim 15, wherein the phase averager circuit comprises a Viterbi-Viterbi processor.

17. An apparatus as claimed in claim 15, wherein the phase averager circuit comprises a phase reference generator to generate a phase reference of the at least partially phase stabilized signal.

18. An apparatus as claimed in claim 17, wherein the rotation ambiguity logic circuit feeds back the phase reference of the at least partially phase stabilized signal to the channel equalizer to provide an equalizer regressor signal for the channel equalizer, the equalizer regressor signal comprising an input signal of the channel equalizer at least partially phase locked by the phase reference.

19. An apparatus as claimed in claim 15, wherein the rotation ambiguity logic circuit provides an equalizer error feedback signal to the channel equalizer.

20. An apparatus as claimed in claim 15, further comprising a differential decoder coupled to receive the at least partially phase stabilized signal from the phase averager prior to the rotation ambiguity logic circuit to decode the signal to obtain data encoded in the signal as a decoded output signal.

21. An apparatus as claimed in claim 20, further comprising a soft decision generator circuit coupled to the rotation ambiguity logic circuit and the differential decoder to provide a soft decision scaling of the decoded output signal.

* * * * *